(12) United States Patent
Gardener

(10) Patent No.: US 7,124,037 B2
(45) Date of Patent: Oct. 17, 2006

(54) DEVICES, SYSTEMS, AND METHODS FOR MONITORING THE OPERATION OF AN INJECTION MOLDING MACHINE

(75) Inventor: Keith B. Gardener, Monroe, NY (US)

(73) Assignee: MPI Incorporated, Poughkeepsie, NY (US)

( * ) Notice: Subject to any disclaimer, the term of this patent is extended or adjusted under 35 U.S.C. 154(b) by 0 days.

(21) Appl. No.: 10/977,963

(22) Filed: Oct. 29, 2004

(65) Prior Publication Data

US 2005/0093191 A1   May 5, 2005

Related U.S. Application Data

(60) Provisional application No. 60/516,141, filed on Oct. 31, 2003.

(51) Int. Cl.
*G01L 7/00* (2006.01)
*G01F 25/00* (2006.01)

(52) U.S. Cl. .................. 702/50; 702/45; 702/100; 73/861; 425/557

(58) Field of Classification Search .................. 702/50, 702/45, 100
See application file for complete search history.

(56) References Cited

U.S. PATENT DOCUMENTS

| 5,097,431 | A | * | 3/1992 | Harada et al. ................. 703/9 |
| 5,316,707 | A | * | 5/1994 | Stanciu et al. ............ 264/40.1 |
| 5,425,270 | A | * | 6/1995 | McDonald et al. ............ 73/168 |
| 6,089,849 | A | * | 7/2000 | Bulgrin et al. ............... 425/149 |
| 6,138,057 | A | | 10/2000 | Stotsky ........................ 700/200 |
| 6,145,022 | A | | 11/2000 | Takizawa et al. ............. 710/10 |
| 6,311,136 | B1 | * | 10/2001 | Henry et al. .................. 702/45 |
| 6,516,241 | B1 | | 2/2003 | Stotsky ........................ 700/200 |
| 6,619,142 | B1 | * | 9/2003 | Forster et al. ........... 73/861.74 |
| 2003/0008028 | A1 | * | 1/2003 | Eppich et al. ............... 425/145 |

OTHER PUBLICATIONS

RJG, Inc., brochure entitled "eDART System™—New Directions in Injection Molding," 16 pages.

* cited by examiner

*Primary Examiner*—John Barlow
*Assistant Examiner*—Jonathan Moffat
(74) *Attorney, Agent, or Firm*—Heslin Rothenberg Farley & Mesiti PC; John Pietrangelo

(57) ABSTRACT

Devices, systems, and methods for monitoring the operation of an injection molding machine, for example, a wax injection molding machine, are disclosed. The devices, systems, and methods may be used for injection molding machines having an injection die, a molding medium injection cylinder, and a control cylinder coupled to the injection cylinder, the control cylinder having a fluid supply conduit. Monitoring and/or control are practiced by monitoring the fluid pressure and the flow rate of the fluid in the conduit. This flow rate and pressure are used to calculate the fluid pressure and flow rate of the molding medium injected into the injection die. A data acquisition system may be used to calculate and output the calculated data. The system can be portable and adaptable for use with any type of injection molding machine and for any injection molding medium.

27 Claims, 11 Drawing Sheets

DEVICES, SYSTEMS, AND METHODS FOR MONITORING THE OPERATION OF AN INJECTION MOLDING MACHINE

CROSS-REFERENCE TO RELATED APPLICATIONS

This application claims priority from pending provisional application 60/516,141 filed on Oct. 31, 2003, the disclosure of which is hereby incorporated by reference herein in its entirety.

TECHNICAL FIELD

This invention relates in general to the monitoring and control of the operation of injection molding machines, in particular, the monitoring and control of injection molding machines by detecting the flow and pressure of the fluid directed to a hydraulic piston.

BACKGROUND OF THE INVENTION

In the injection molding industry, the monitoring and control of the injection molding process is typically critical to the proper molding of the desired part, for example, a part free of voids and defects. It is recognized in the art, that one way of controlling the quality of the part produced is to monitor and control the pressure and flow rate of the injected molding medium, for example, fluid wax or plastic, or molten metal. One recognized method for monitoring the pressure of the molding medium is to monitor the pressure directly by introducing a pressure sensing device in the molding medium injection conduit. This method of detecting molding medium pressure is disclosed in U.S. Pat. No. 5,316,707 and is typical of similar practices in the art. One recognized method for monitoring the flow rate of the molding medium is to monitor the deflection of the hydraulic piston used to displace the molding medium injection piston and, from the geometries of the respective piston bores, calculating the flow rate of molding medium to the mold. This method of determining mold medium flow rate is also disclosed in U.S. Pat. No. 5,316,707 and is also typical of similar practices in the art.

However, these prior art methods of monitoring the operation of an injection molding machine have disadvantages. For example, such methods must typically be dedicated to a specific machine and are typically not transferable to other machines, for example, other local or remote injection molding machines. In addition, these prior art methods require the interested party to have some form of access to the molding injection passage to insert a pressure detecting device to detect injection pressure and access to the injection piston to physically monitor its deflection. These disadvantages, among others, are overcome by aspects of the present invention.

SUMMARY OF THE INVENTION

The shortcomings of the prior art are overcome and additional advantages are provided through aspects of the present invention. One aspect of the invention is a system for monitoring the operation of an injection molding machine, the injection molding machine having an injection die, a molding medium injection cylinder having a piston, and a control cylinder having a piston coupled to the molding medium injection piston, and wherein the control cylinder is supplied with a fluid having a flow rate and a pressure, the system including means for monitoring at least one of the fluid pressure and the flow rate and outputting electrical signals corresponding to at least one the fluid pressure and flow rate; and an arithmetic processor adapted for receiving the electrical signals corresponding to at least one of the fluid pressure and the flow rate, the arithmetic processor having means to manipulate at least one of the fluid pressure and the flow rate to determine at least one of the fluid pressure and flow rate of the molding medium injected into the injection die. In one aspect of the invention, the means to manipulate at least one of the fluid pressure and the flow rate comprises means for evaluating at least one of the equations:

$$Q_D = Q_1 \times A_2/A_1 \qquad \text{Equation 1}$$

and $$P_D = P_1 \times A_1/A_2; \qquad \text{Equation 2}$$

wherein $Q_1$ is the monitored flow rate of the fluid; $P_1$ is the monitored pressure of the fluid; $A_1$ is the area of the control cylinder piston; $A_2$ is the area of the molding medium injection cylinder piston; $Q_D$ is the flow rate to the injection die; and $P_D$ is the pressure in the injection die.

Another aspect of the invention is a device for monitoring the operation of a injection molding machine, the injection molding machine having an injection die and a control cylinder having at least one conduit in fluid communication with the control cylinder, the device including at least one of a flow detecting device adapted to output an electrical signal corresponding to the fluid flow in at least one conduit and a pressure detecting device adapted to output an electrical signal corresponding to the pressure in at least one conduit; and means for inserting the device into the at least one conduit in fluid communication with the control cylinder. In one aspect of the invention, the flow detecting device comprises a flow meter. In one aspect of the invention, the pressure detecting device comprises a pressure transducer.

A further aspect of the invention is a method for monitoring the operation of a injection molding machine, the injection molding machine having an injection die, a molding medium injection cylinder having a piston, and a control cylinder having a piston coupled to the molding medium injection cylinder piston, the control cylinder supplied with fluid by at least one conduit, the method including detecting at least one of the fluid flow rate in the at least one conduit and the fluid pressure in the at least one conduit; and calculating at least one of the fluid flow to and the fluid pressure in the injection die using at least one of the fluid flow rate and the pressure in the at least one conduit. In one aspect of this invention, calculating comprises evaluating Equations 1 and 2 above.

Further additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE OF CARRYING OUT THE INVENTION

Aspects of the present invention provide methods and devices which facilitate the monitoring and/or control of the operation of injection molding machines. In one aspect, methods and devices are provide that provide portable systems and devices which can be dedicated to one or more machines or adaptable for use for a plurality of machines, for example, machines provided by one supplier or by different suppliers.

Figure 1:
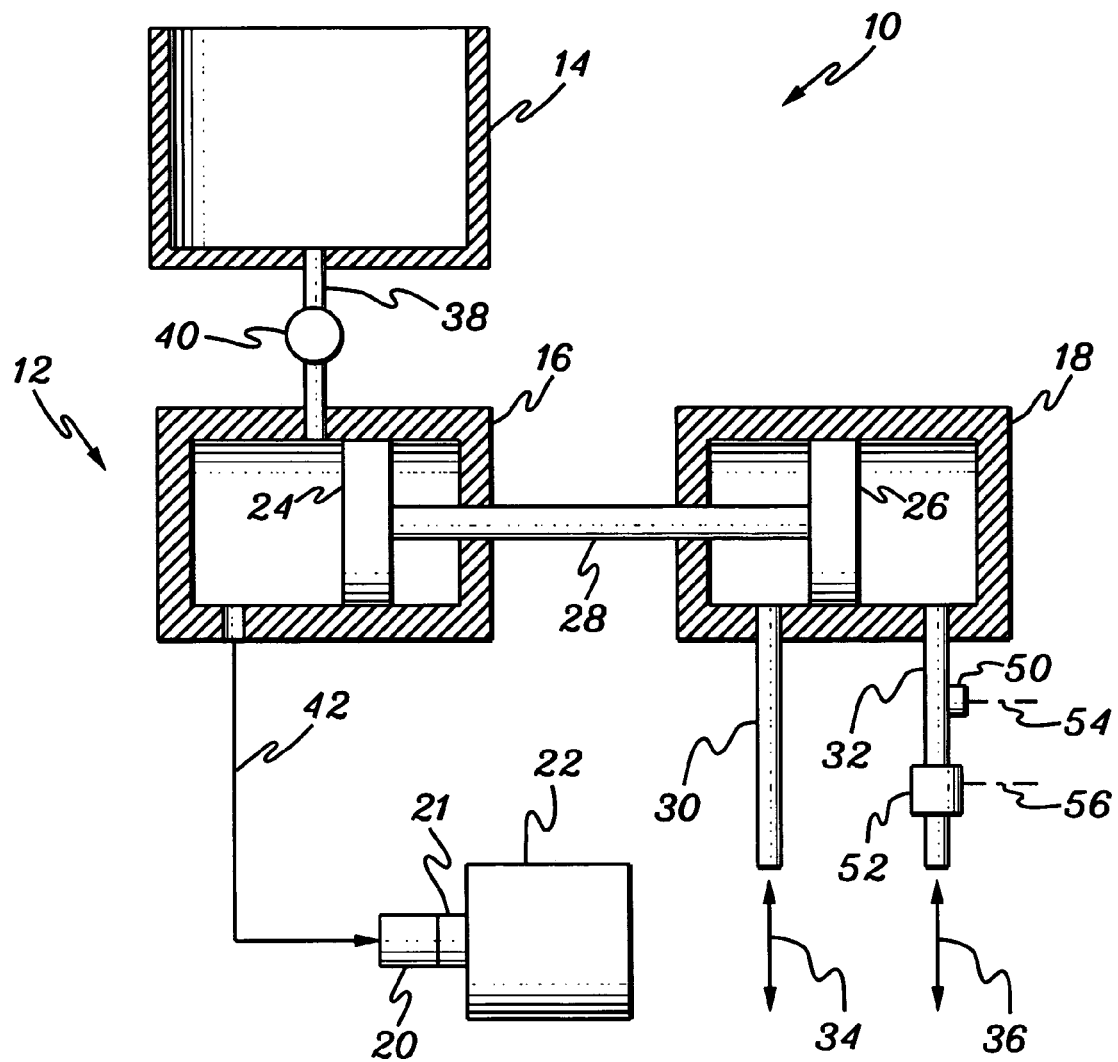
FIG. 1 depicts a schematic diagram, partially in cross-section, of an injection molding monitoring system in accordance with an aspect of the present invention.

FIG. 1 presents a schematic view, partially in cross-section, of an injection molding machine monitoring system 10 according to one aspect of the present invention. To facilitate this disclosure of aspects of the invention, the following discussion will assume that the molding medium is wax; however, it is to be understood that the present invention is not limited to use with wax but may be applied to all types of injection molding devices and media, including wax, plastic, and molten metal, among others. System 10 includes an injection molding machine 12 including a fluid wax reservoir 14, a wax injection cylinder 16, a control cylinder 18, an injection nozzle 20, and a die 22. As is typical in the art, injection cylinder 16 includes a moveable injection piston 24 and control cylinder 18 includes a moveable piston 26 connected by piston rod 28. Though not shown in FIG. 1, it is to be understood that cylinders 16 and 18 include appropriate bearings and seals to ensure substantially unobstructed movement of rod 28 and pistons 24 and 26 with little or no leakage from the cylinders or past the pistons. Though pistons 24 and 26 are illustrated as single-rod pistons, it is also understood that pistons 24 and 26 may be double-rod pistons. It is also understood that in one aspect to the invention control cylinder 18 may be a hydraulic or a pneumatic cylinder.

As is typical in the art, the movement of hydraulic (or pneumatic) piston 26 is governed by the introduction and removal of hydraulic fluid via conduits 30 and 32. As indicated by double arrows 34, 36, respectively, the flow of hydraulic fluid may be into or out of cylinder 18 depending upon the phase of operation of the injection molding machine 12. The pressurized hydraulic fluid is typically supplied to conduit 30 or 32 from a conventional source of pressurized hydraulic fluid, for example, one or more hydraulic pumps or accumulators (not shown). The flow of hydraulic fluid to conduits 30 and 32 may be regulated by means of one or more valves (also not shown), for example, one or more ball, gate, or spool valves, for example, one or more solenoid-controlled spool valves, as appropriate.

As is also typical in the art, injection cylinder 16 is provided with a supply of wax from reservoir 14 via conduit 38 having valve 40. As is also typical in the art, during the injection process, wax from cylinder 16 is directed to die nozzle 20 via conduit 42. Conduit 42 may be a rigid conduit or a flexible conduit. Conduit 42 may direct wax to die nozzle 20 adjacent cylinder 16 or to a die nozzle 20 remote from cylinder 16. Die nozzle 20 directs wax into die 22 to fill the desired mold as appropriate.

According to aspects of the present invention, system 10 also includes at least two sensing devices that are used to at least monitor the flow and pressure of the hydraulic fluid introduced to hydraulic cylinder 18. In one aspect of the invention, conduit 32 is equipped with at least one pressure detecting device 50 and at least one flow detecting device 52. In one aspect of the invention, one or both devices 50, 52 may be located in or on conduit 30. Pressure detecting device 50 may be a conventional pressure transducer, for example, a pressure transducer adapted to output an electrical signal 54 corresponding to the pressure in conduit 32. Signal 54 may typically be forwarded to a data acquisition and processing device, for example, a PLC controller or a computer (not shown). Pressure transducer 50 and the pressure in conduit 32 may have a pressure range from about 0 pounds per square inch, gauge (psig), to about 3000 psig and signal 54 may be a 4–20 milliamp (mA) signal or a 0–1 VDC signal, among others. Flow detecting device 52 may be a conventional flow meter, for example, a flow meter adapted to output an electrical signal 56 corresponding to the flow through conduit 32. Signal 56 may also typically be forwarded to a data acquisition and processing device, for example, a PLC controller or a computer (not shown). Flow meter 52 may have flow range of from about 0 gallons per minute (gpm) to about 6 gpm and signal 56 may be a 4–20 milliamp (mA) signal or a 0–1 VDC signal, among others.

According to one aspect of the invention, the volumetric flow and pressure provide by system 10 to die nozzle 20, for example, the volumetric flow through and pressure in wax injection conduit 42, may at least be determined by detecting the volumetric flow and pressure in conduit 30. In another aspect of the invention, the volumetric flow and pressure in system 10 to die nozzle 20 may be monitored by measuring the volumetric flow and pressure in conduit 32. That is, contrary to prior art practice, the operation or performance of injection molding machine 12 may be detected and monitored by detecting and monitoring the flow of fluid in one of the hydraulic supply conduits to the hydraulic cylinder 18. For example, contrary to the prior art, aspects of the present invention obviate the need to directly tap into a cylinder or conduit, for example conduit 42, to detect the pressure of the molding medium. Also, contrary to the prior art, aspects of the present invention obviate the need to detect the location or displacement of hydraulic piston 24 or 26 to monitor the volumetric flow rate to die 22.

According to one aspect of the invention, the volumetric flow rate through conduit 42, that is, $Q_D$, and the hydraulic pressure in conduit 42, that is, $P_D$, may be calculated by the following equations:

$$Q_D = Q_1 \times A_2 / A_1 \qquad \text{Equ. 1}$$

$$P_D = P_1 \times A_1 / A_2 \qquad \text{Equ. 2}$$

In equations 1 and 2, $Q_1$ is the flow rate detected by flow measuring device 52; $P_1$ is the pressure detected by pressure detecting device 50; $A_1$ is the area of piston 26 of control cylinder 18 exposed to pressure $P_1$; and A2 is the area of piston 24 of cylinder 16 exposed to pressure $P_D$. Equations 1 and 2 may include appropriate unit conversion factors depending upon the units of measurement desired. These calculations and the display of the results of these calculations may be provided by a data acquisition and processing device. The results may be stored or displayed to an operator, for example, graphically displaced as a function of time.

According to one aspect of the invention, the temperature of the wax, or other medium, flowing into die 22 may be monitored. For example, referring to FIG. 1, a temperature sensing device 21, for example, thermocouple or RTD, may be located anywhere in the path of flow of the wax from cylinder 16, for example, located between die nozzle 20 and die 22, to measure the temperature of the wax flowing therethrough. The temperature may also be recorded and graphed as a function of time and displayed on a computer monitor and/or output to an appropriate output device, for example, a printer.

Figure 2:
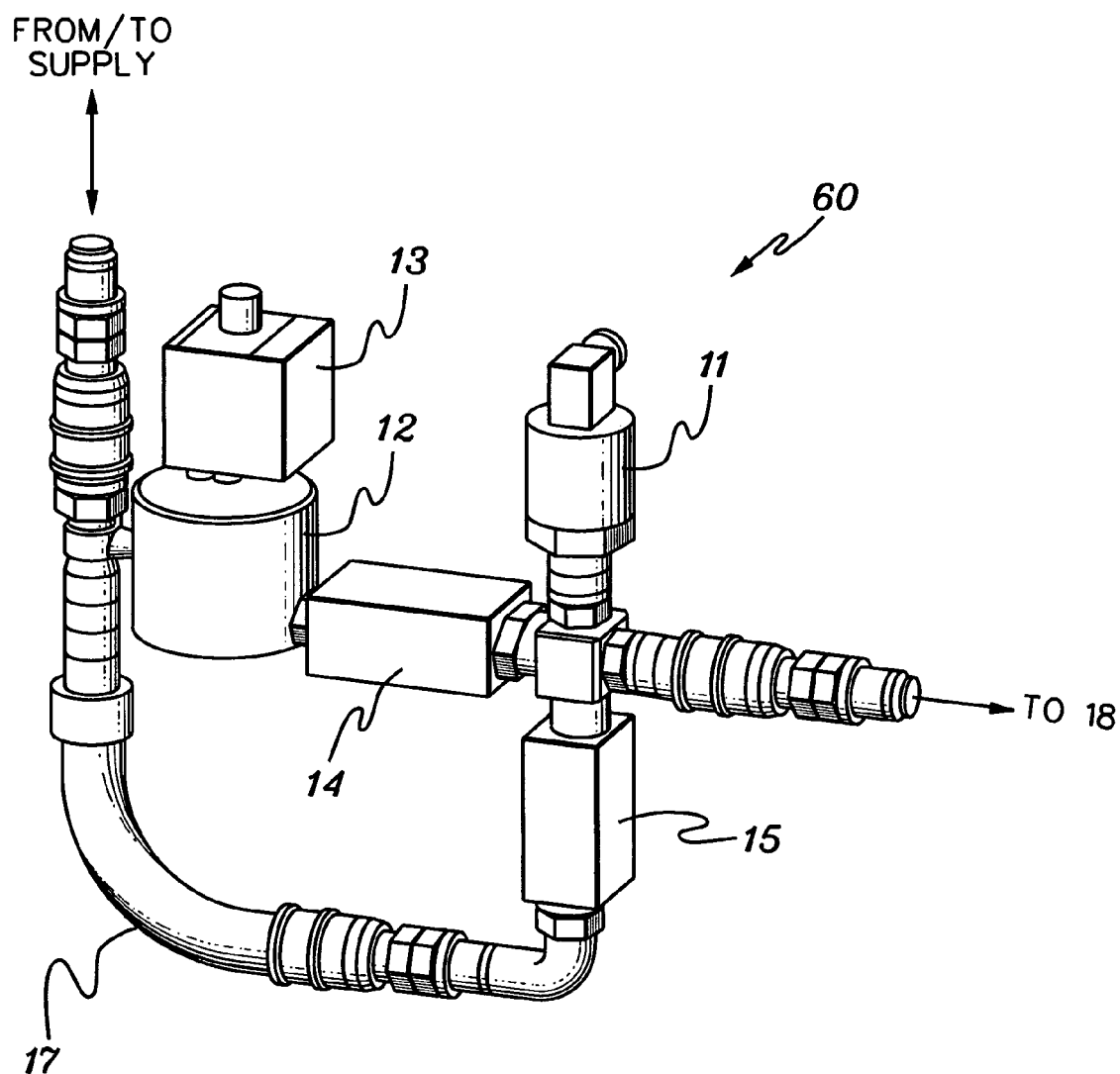
FIG. 2 depicts a perspective view of a flow and pressure detecting device for an injection molding machine in accordance with another aspect of the present invention.
Figure 3:
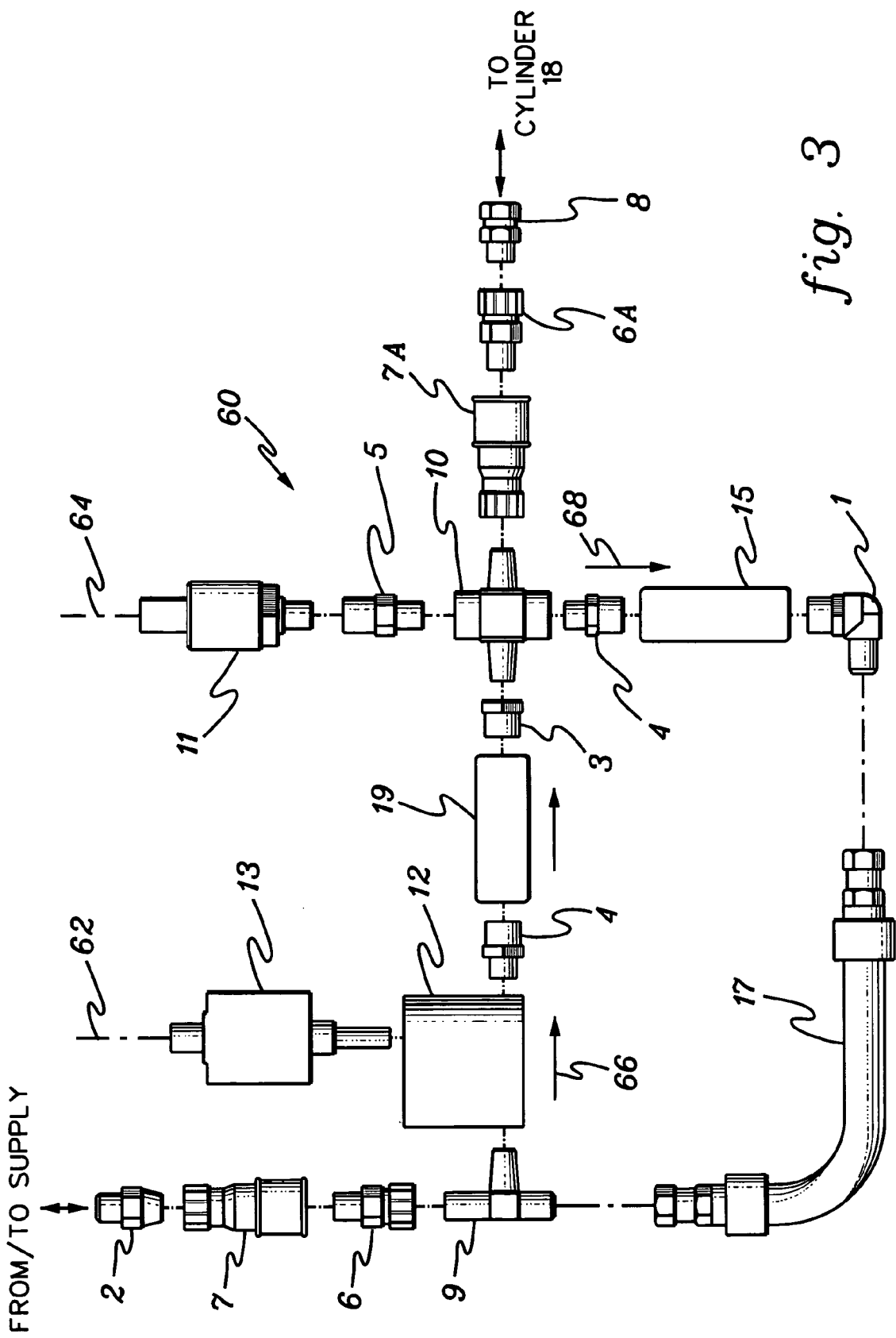
FIG. 3 depicts an exploded elevation view of the device shown in FIG. 2.

FIG. 2 illustrates a perspective view of one device 60 that may be used to implement aspects of the invention shown and described with respect to FIG. 1. FIG. 3 illustrates an exploded elevation view of the device 60 shown in FIG. 2. A system employing device 60 is marketed under the name MODEL 20—20 Stand-Alone Graphing System by MPI Incorporated of Poughkeepsie, N.Y.

As shown in FIG. 3, device 60 may include a series of pipe fittings and fluid flow devices for implementing aspects of the invention. In the aspect shown, device 60 may include a flow meter 12, corresponding to flow detecting device 52 shown in FIG. 1; and a pressure transducer 11, corresponding to pressure detecting device 50 shown in FIG. 1. In this aspect of the invention, flow meter 12 is coupled to flow meter sensor 13 which outputs a corresponding electrical signal 62, which corresponds to electrical signal 56 in FIG. 1. Also, pressure transducer 11 outputs a corresponding electrical signal 64, which corresponds to electrical signal 54 in FIG. 1.

In this aspect of the invention, conduit 32 in FIG. 1 corresponds to and includes fittings 2, 7, 6, 9, 4, 3, 10, 7A, 6A, and 8 in FIG. 3. Fitting 2 may be a standard fitting having a male pipe thread (MPT), for example, a fitting provided by Tompkins Industries of Olathe, Kans. Fittings 7 and 7A may be female quick disconnect (QD) fittings having a female pipe thread (FPT), for example, a fitting provided by Aeroquip of Maumee, Ohio. Fittings 6 and 6A may be male QD fittings having a FPT, for example, a fitting provide by Aeroquip. Fitting 9 may be a MPT tee fitting, for example, a tee fitting provided by Aeroquip. Fitting 4 may be an adapter fitting, for example, a fitting having a MPT, for instance, an adapter fitting provide by Tompkins Industries. Fitting 3 may be a reducing bushing (RB) having a MPT and a FPT, for example, a RB provided by Tompkins Industries. Fitting 10 may be a cross fitting having MPTs and FPTs, for example, a cross fitting provided by Aeroquip. Fitting 8 may be a fitting having a MPT, for example, a fitting provided by Tompkins Industries.

Fitting 8 may be operatively connected to a hydraulic cylinder, for example, cylinder 18 in FIG. 1. That is, during the injection process, the flow of fluid from the fluid supply flows from fitting 2 to fitting 8 in FIG. 3 as indicated by arrow 66. The pressure of the flow of fluid during injection is detected by pressure transducer 11 that communicates with the injection flow via fitting 5 and fitting 10. Fitting 5 may be an adapter fitting, for example, BSPP fitting having a MPT, for instance, an adapter fitting provide by Tompkins Industries.

According to another aspect of the invention, device 60 may also include a bypass conduit 17. Bypass conduit 17 may bypass fluid around transmitter 12 during the injection cylinder filling process, for example, when injection piston 24 is withdrawn from cylinder 16 and wax is drawn into cylinder 16. During this phase of operation, with reference to FIG. 1, fluid is withdrawn from cylinder 18 via conduit 32 and passed to, for example, a reservoir or sump (not shown) for later use or disposal. With respect to device 60 shown in FIG. 3, during this phase of operation, fluid flows from fitting 8 to fitting 2 as indicated by arrow 68. In one aspect of the invention, device 60 may include a check valve 19 for preventing flow through flow meter 12 during the cylinder filling stage. During this injection cylinder filling process, fluid flows through fittings 8, 6A, 7A, 10, 4, 1, 9, 6, 7 and 2; conduit 17; and a check valve 15, and to the supply. Fitting 1 may be a 90-degree elbow having a MPT, for example, a 90-degree elbow provided by Tompkins Industries. Conduit 17 may be a high-pressure hydraulic hose, for example, a hose having a 3000 psi pressure rating, for instance, a hose provided by Aeroquip. During the mold filling phase of operation, this by-pass flow may be prevented by check valve 15. Check valves 15 and 19 may be inline check valves having dual FPTs, for example, inline check valves provided by Parker Hannifin.

It will be apparent to those of skill in the art that many different fittings and fitting combinations may be used to implement device 60 without deviating from the desired function of the invention.

According to one aspect of the invention, device 60 provides a convenient apparatus for accessing the hydraulic supply conduits, for example, conduits 30 or 32 shown in FIG. 1, to obtain pressure and flow readings from one or both of these conduits. According to one aspect of the invention, existing injection molding machines may be fitted with readily accessible hydraulic conduits having fittings whereby device 60 may be easily installed. In one aspect of the invention, device 60 may be used with any injection molding system that is hydraulically driven. According to another aspect of the invention, device 60 may be used with injection molding machines provided by MPI Incorporated of Poughkeepsie, N.Y., for example, with systems marketed by MPI under the names MPI 34, MPI 44, MPI 45, MPI 54, MPI 55, MPI 104, and MPI 105, among others.

Figure 4:
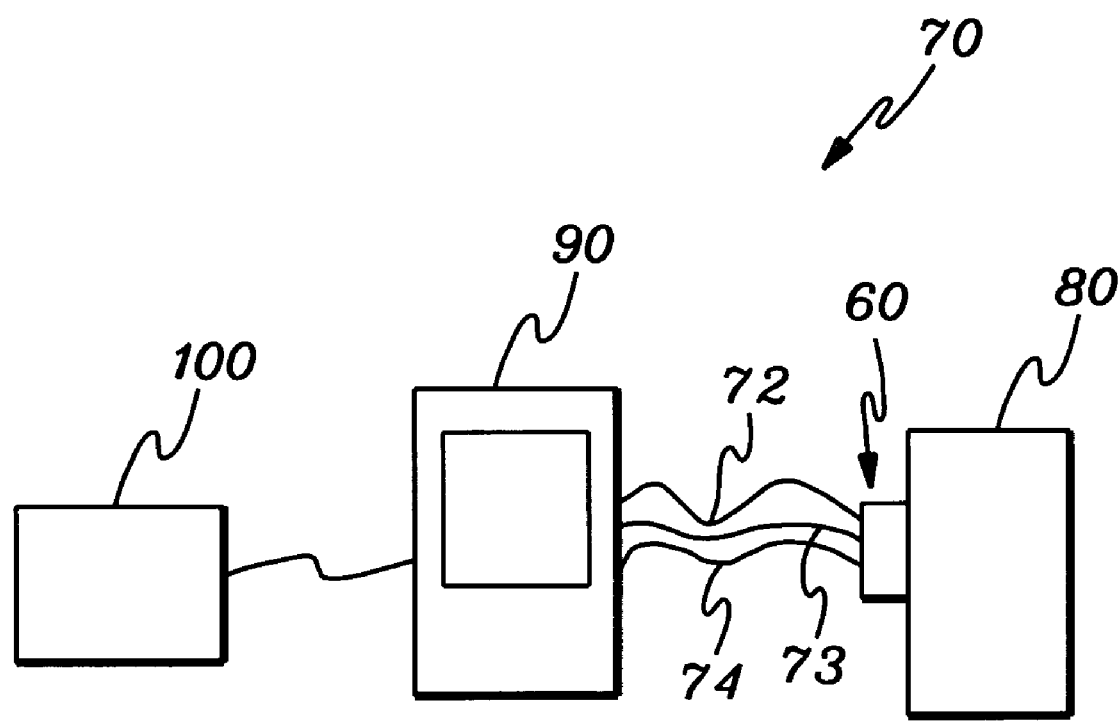
FIG. 4 depicts a schematic view of a monitoring system in accordance with another aspect of the present invention.

Another aspect of the present invention is illustrated in FIG. 4. FIG. 4 is a schematic illustration of a system 70 that can be used to monitor the performance of an injection molding system 80, for example, a system similar to injection molding system 12 shown in FIG. 1. According to this aspect of the invention, system 70 may be a portable device that can be installed in the field to monitor, for example, trouble shoot, the operation of an injection molding system 80. According to this aspect of the invention, system 70 includes device 60, as shown in FIGS. 2 and 3, integrated into system 80, as described with respect to FIGS. 1 and 2, and at least one data acquisition system 90. Device 60 provides at least two electrical leads 72, 74 that transfer the pressure and flow data from device 60 to data acquisition system 90. A third electrical lead 73 may carry signals from temperature sensing device 21, for example, a thermocouple, (see FIG. 1) representing the temperature of the wax. Data acquisition system 90 may be a conventional system providing a user interface and means for receiving, manipulating, and outputting or displaying data. System 90 may be a PLC controller, for example, a small form factor PLC to perform the data collection and math functions. System 90 may be a computer, for example, a laptop computer that can be readily transported, with device 60, to remote locations. In one aspect of the invention, system 70 may also include a data output device 100, for example, a printer. The output device 100 may also be a computer running a graphing application, for example, Microsoft® Windows™ CE Operating System with, for example, a touch screen.

Figure 5A:
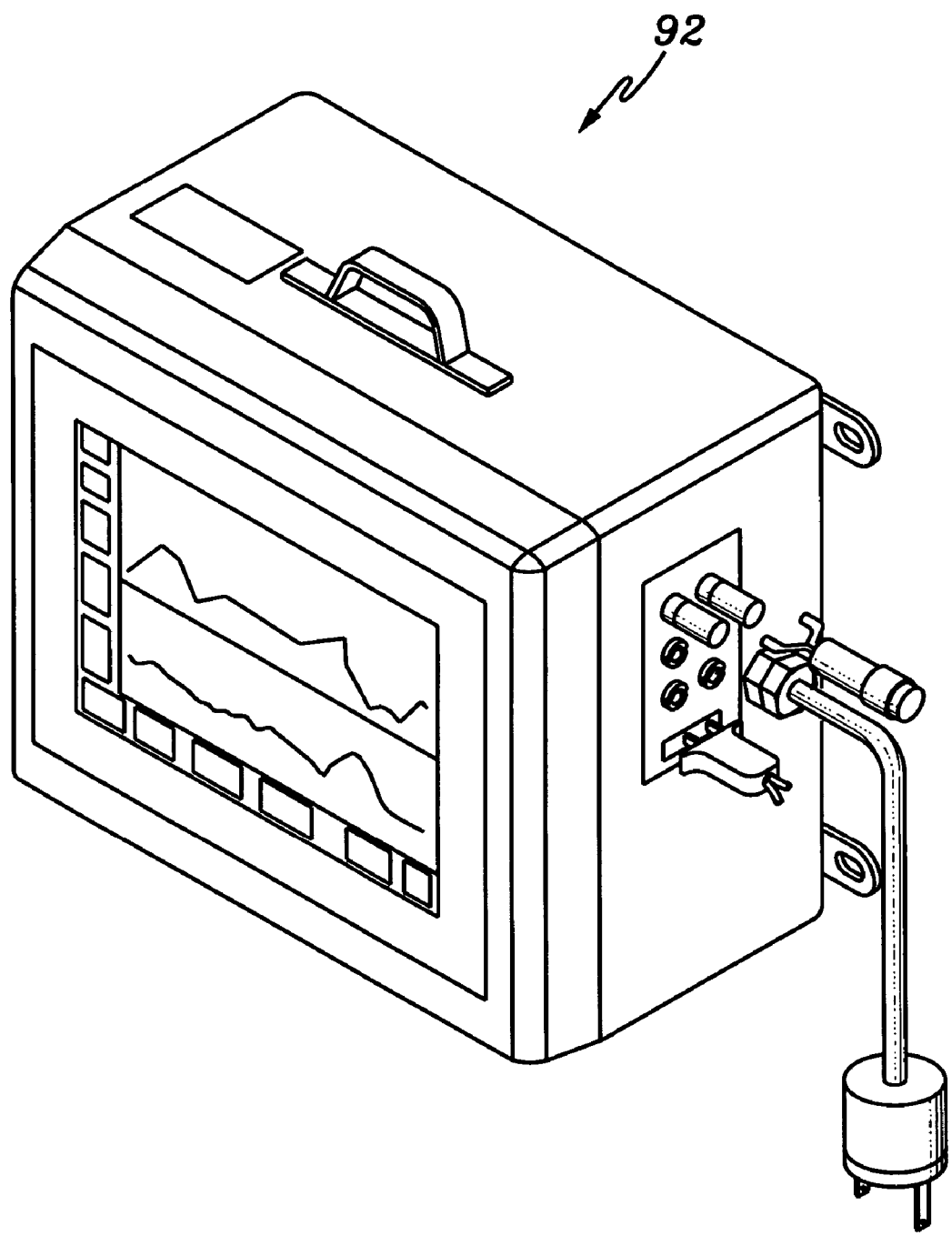
FIGS. 5A–5D depict assorted views of a data acquisition system that may be used in monitoring the system shown in FIG. 4.
Figure 5B:
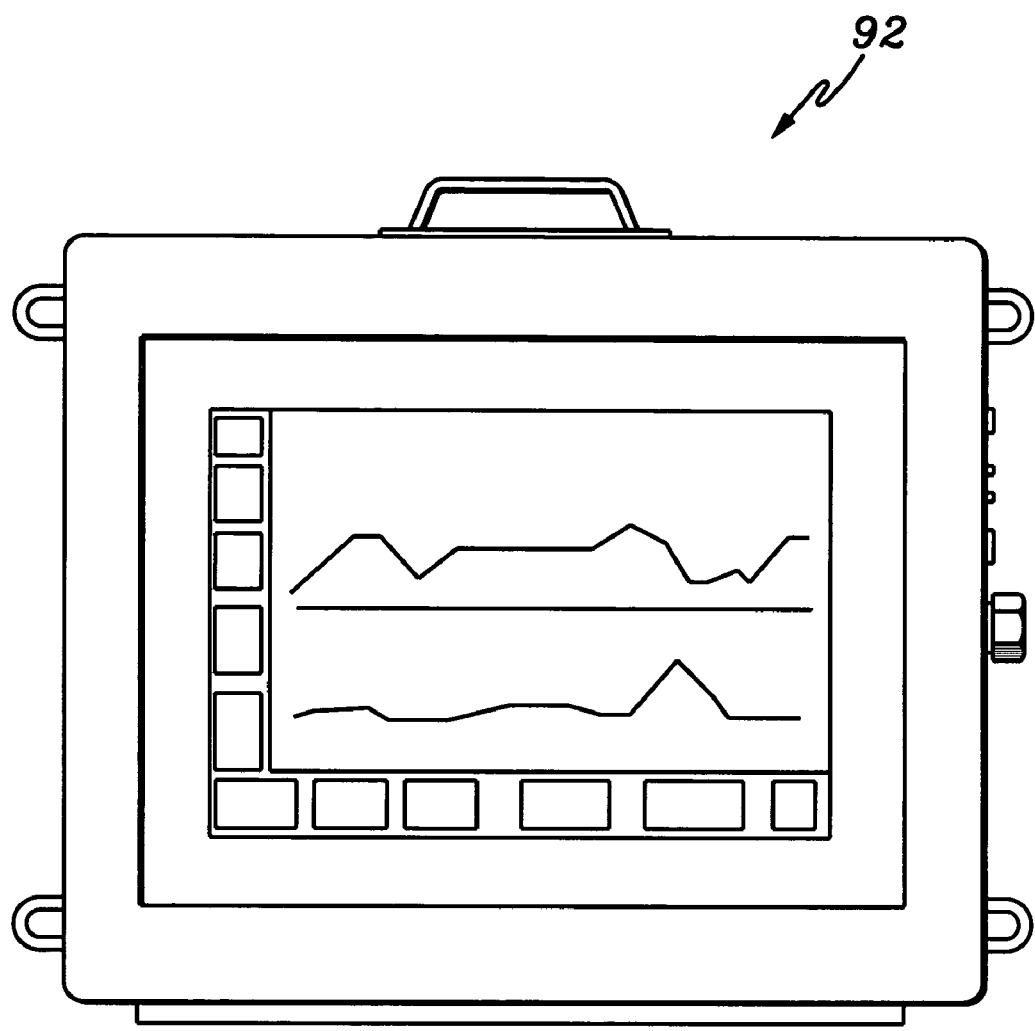
Figure 5C:
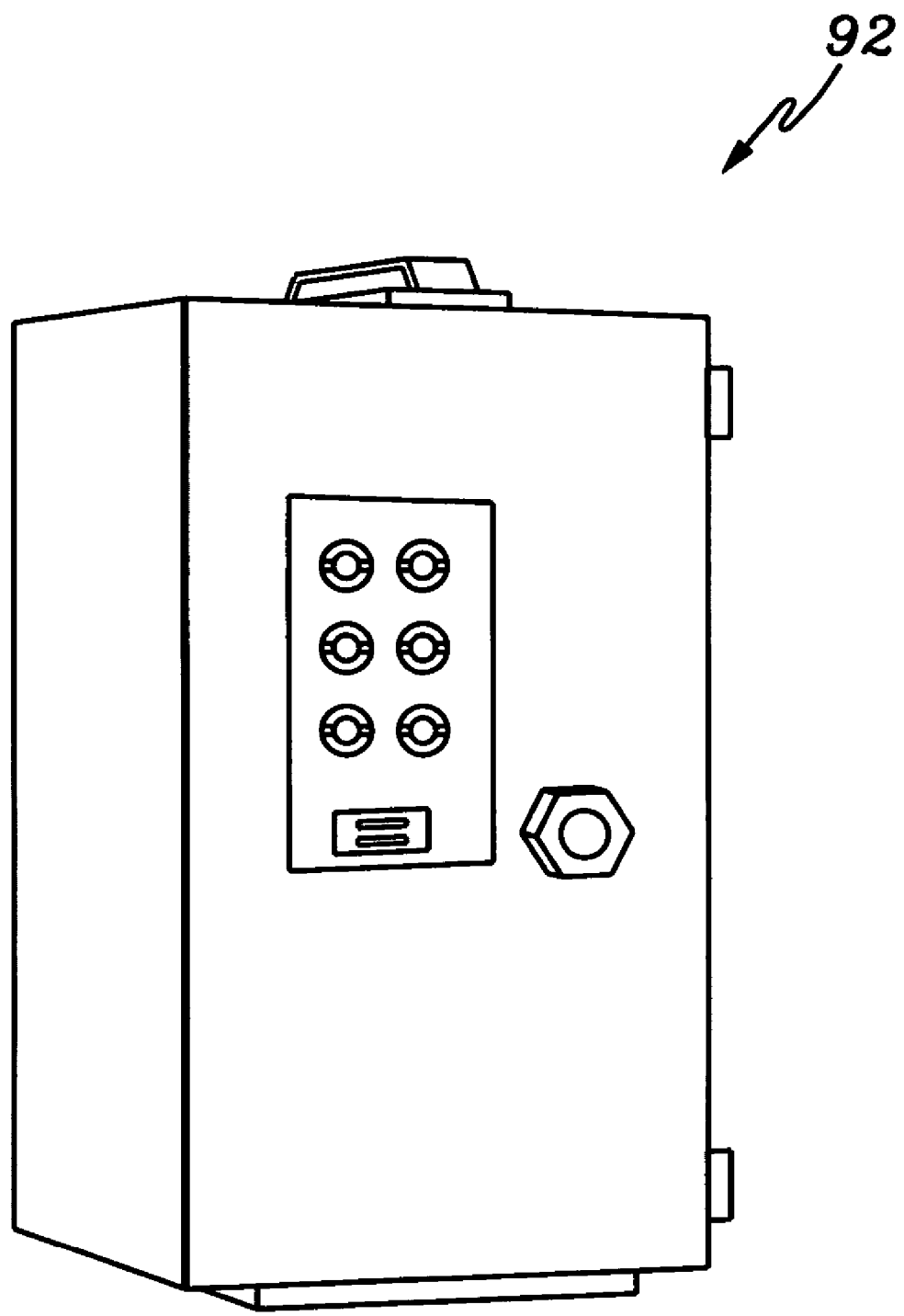
Figure 5D:
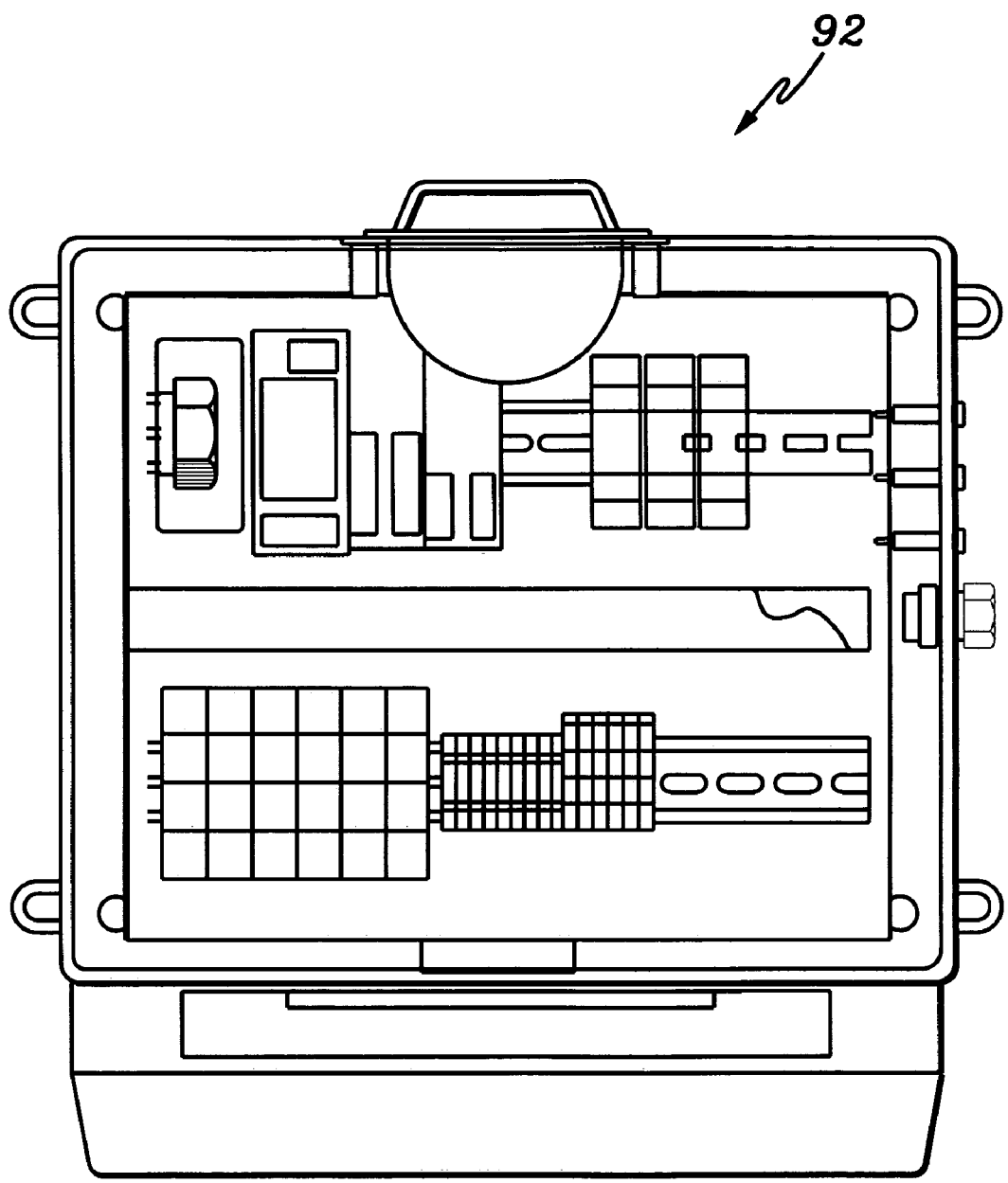

FIGS. 5A–5D illustrate one type of data acquisition system 92 that may be used for data acquisition system 90 in system 70 shown in FIG. 4 according to one aspect of the invention. FIG. 5A is a perspective view of data acquisition system 92; FIG. 5B is a front elevation view of system 92; FIG. 5C is a side elevation view of system 92; and FIG. 5D is a rear elevation view of system 92 where the rear access panel is removed to expose the internal components of system 92. FIGS. 5A–5D illustrate a data acquisition system 92 that is marketed under the name MODEL 20—20 PROCESS VISION by MPI Incorporated, though other types of systems may be used.

Figure 6:
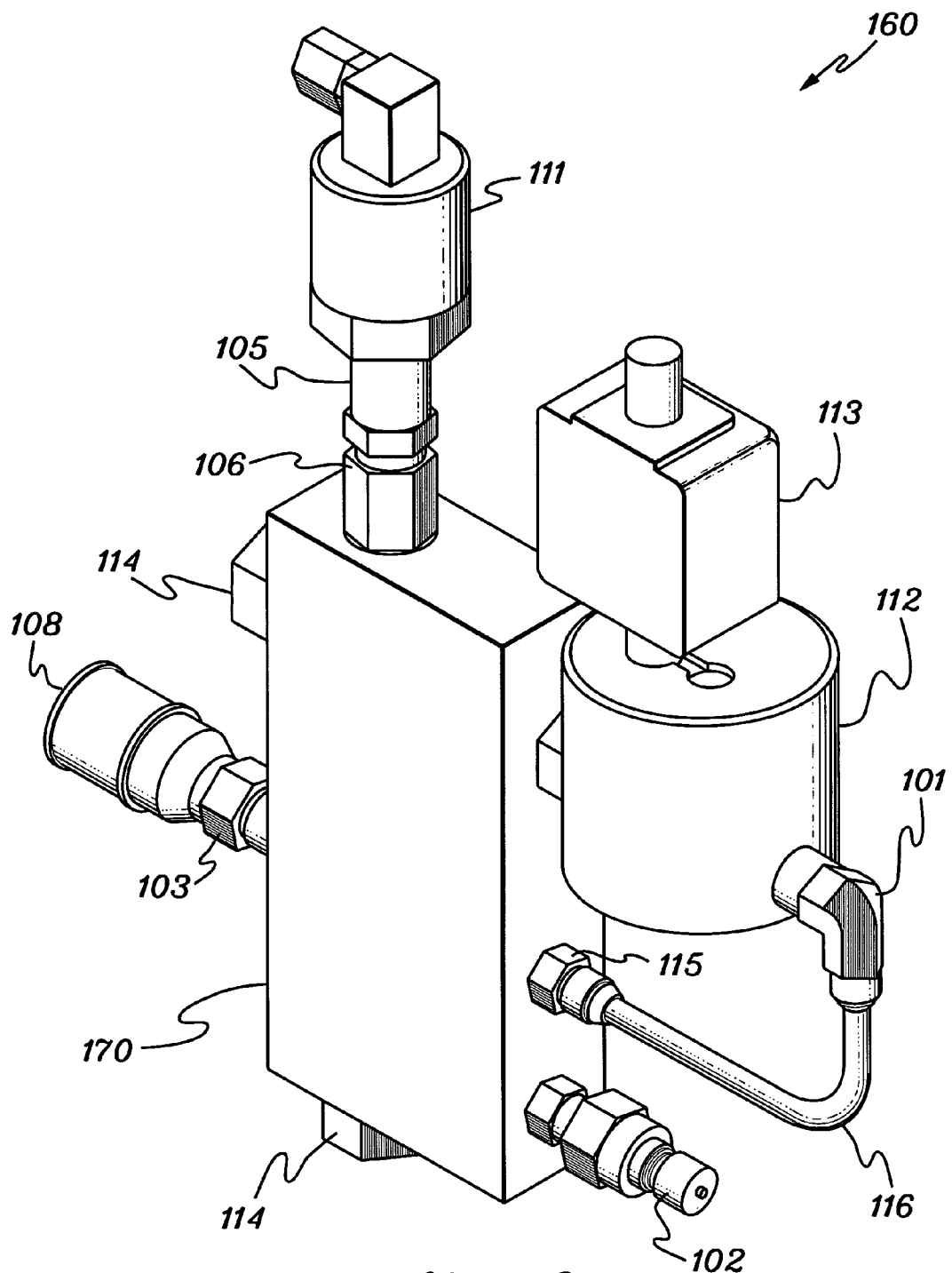
FIG. 6 depicts a perspective view of another aspect of the invention.
Figure 7:
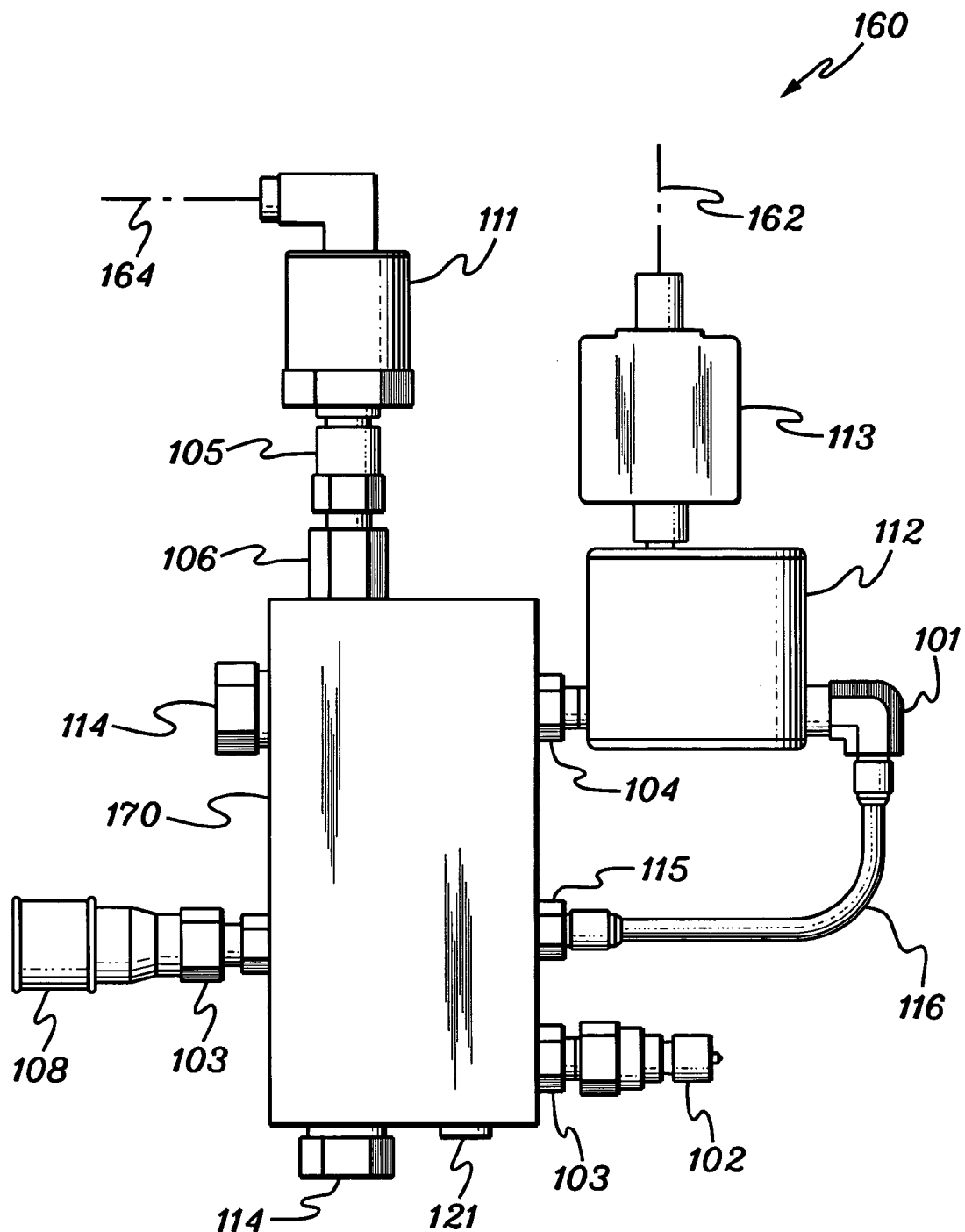
FIG. 7 is a front elevation view of the aspect of the invention shown in FIG. 6.
Figure 8:
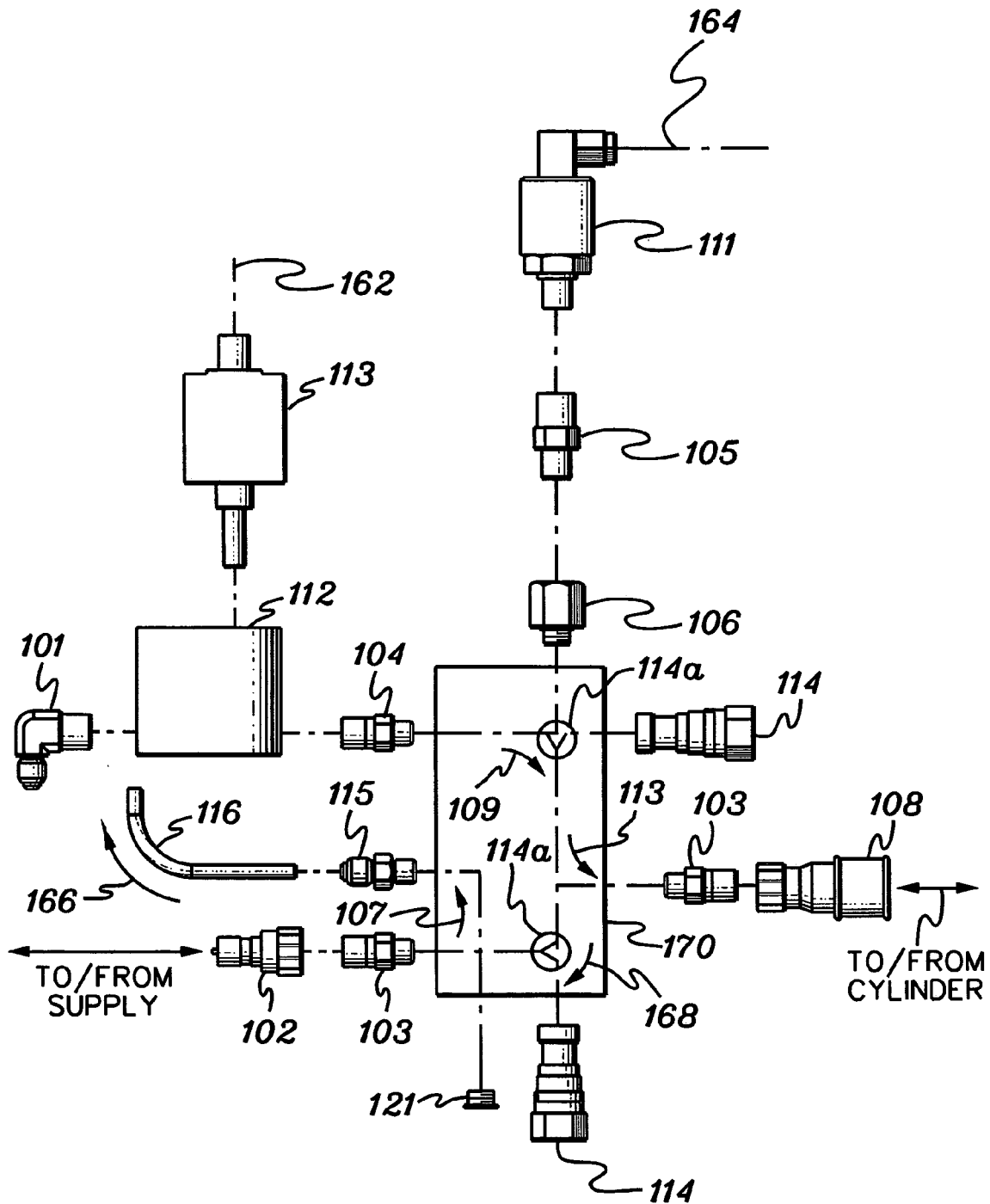
FIG. 8 is an exploded rear elevation view of the aspect of the aspect of the invention shown in FIG. 6.

FIG. 6 depicts a perspective view of another device 160 according to another aspect of the invention. FIG. 7 is a front elevation view of device 160 shown in FIG. 6. FIG. 8 is an exploded rear elevation view of device 160 shown in FIG. 6. Device 160 may be marketed under the name MODEL 20—20 Process Vision Hydraulic Assembly by MPI Incorporated. As shown in FIGS. 6, 7, and 8, device 160 may include many of the devices and fittings that are present in device 60 shown in FIGS. 2 and 3. However, in the aspect of the invention shown in FIG. 6, 7, and 8, some of the conduit and related fittings of device 60 may be replaced by one or more hydraulic manifolds 170. According to one aspect of invention manifold 170 may be used to facilitate fabrication, assembly, and installation of the sensing devices and related fittings of device 60 shown in FIGS. 2 and 3. For example, tee 9 and cross-fitting 10, among other items, of device 60 may be replaced by manifold 170. According to this aspect of the invention manifold 170 includes at least one, but typically a plurality of internal passages (shown by dashed lines) that permit fluid communication between the sensors and fittings mounted to manifold 170. The internal passages may be threaded as appropriate to provide for conventional mounting of fittings and sensors.

Manifold 170 may be metallic or non-metallic. For example, in one aspect manifold 170 may be made from one or more of the following metals: iron, steel, stainless steel, aluminum, titanium, nickel, magnesium, brass, bronze, or any other structural metal. In one aspect of the invention, manifold 170 may be a machined aluminum structure. In other aspects, manifold 170 may be fabricated by casting or forging, among other fabrication processes. In one aspect of the invention, manifold 170 may also be made from one or more of the following plastics: polyamide (PA), for example, nylon; a polyethylene (PE); a polypropylene (PP); a polyester (PE); a polytetraflouroethylene (PTFE); an acrylonitrile butadiene styrene (ABS); a polycarbonate (PC); or a polyvinylchloride (PVC), among other plastics.

Similar to device 60, device 160 may include a flow meter 112, for example, corresponding to flow detecting device 52 shown in FIG. 1; and a pressure transducer 111, for example, corresponding to pressure detecting device 50 shown in FIG. 1. In this aspect of the invention, flow meter 112 is coupled to a flow meter sensor 113 which outputs a corresponding electrical signal 162, which corresponds to electrical signal 56 in FIG. 1. Also, pressure transducer 111 outputs a corresponding electrical signal 164, which corresponds to electrical signal 54 in FIG. 1.

Again, similar to device 60, device 160 includes fittings for mounting the sensors and interfacing with manifold 170. Device 160 includes a fitting 104 for mounting flow meter 112 to a passage in manifold 170. Fitting 104 may be similar to fitting 4 shown in FIG. 3, for example, a reducing bushing (RB) having a MPT and a FPT. Similarly pressure transducer 111 may be mounted to a passage in manifold 170 by means of fittings 105 and 106. Fitting 105 may be similar to fitting 5 shown in FIG. 3, for example, fitting 105 may be a BSPP adapter fitting having a MPT. Fitting 106 may be an adapter fitting, for example, an SAE O-ring-type fitting having a male SAE O-ring thread and a female pipe thread, for instance, an adapter fitting supplied by Tompkins Industries, or its equivalent.

Fitting 102 provides an interface for connecting device 160 to a supply of fluid (not shown), for example, to a supply of pressurized hydraulic fluid. Fitting 102 may be similar to fitting 6 in FIG. 3, for example, fitting 102 may be a male quick-disconnect (QD) fitting having a female pipe thread (FPT). Fitting 102 may be mounted manifold 160 by means of fitting 103. Fitting 103 may be a reducing bushing. The fluid supplied by fitting 102 may be passed to manifold 170 and then through an internal conduit in manifold 170, as indicated by arrow 107 in FIG. 8, to fitting 115, conduit 116, and fitting 101 to flow meter 112. Fitting 115 may be a fitting having a male o-ring thread and a 37-degree male flare fitting, for instance, a fitting available from Tompkins Industries, or its equivalent. Conduit 116 may be tubing, for example, steel tubing having a diameter of between about 0.25 inches and 1 inch, for example, having a diameter of about 0.375 inches. Fitting 101 may be a 90-degree elbow, for example, similar to the 90-degree elbow fitting 1 of FIGS. 2 and 3.

Fitting 108 is mounted in manifold 170 by means of another fitting 103. Fitting 108 may be similar to fitting 7 shown in FIG. 3, for example, fitting 108 may be a female quick disconnect (QD) fitting having a female pipe thread (FPT). According to one aspect of the invention, fitting 108 may be operatively connected to a hydraulic cylinder, for example, cylinder 18 in FIG. 1. That is, as shown in FIG. 8, during the injection process, the flow of fluid from the fluid supply flows from fittings 102 and 103, thorough manifold 170 as indicted by arrow 107, through fitting 115, tube 116, fitting 101 (as indicated by arrow 166), flow meter 112, and fitting 104 to manifold 170. The flow then enters manifold 170 and passes through internal passages in manifold 170 as indicated by arrows 109 and 113 to fittings 103 and 108 to the cylinder.

The pressure of the flow of fluid during injection is detected by pressure transducer 111 that communicates with the injection flow though manifold 170 via fittings 105 and 106, described above.

According to another aspect of the invention, device 160 may also include a bypass from fitting 108 through manifold 170 and to fitting 102 This bypass may be used to bypass fluid around transmitter 112 during the injection cylinder filling process, for example, when injection piston 24 (FIG. 1) is withdrawn from cylinder 16 and wax is drawn into cylinder 16 from supply 14. With respect to device 160 shown in FIG. 8, during this phase of operation, fluid flows from fitting 108 to fitting 102 as indicated by arrow 168 in FIG. 8.

In one aspect of the invention, device 160 may include at least one check valve 114 for directing the flow through manifold 170. As shown in FIGS. 6, 7, and 8, in one aspect, manifold 170 may include at least two check valves 114. As shown in FIG. 8, one check valve 114 may regulate the direction of flow through manifold 170 as indicated by arrow 109 and another check valve 114 may regulate the flow through manifold 170 as indicated by arrow 168. The function of check valves 114 is illustrated by the check valve schematics 114A in manifold 170 in FIG. 8. Check valves 114 may be spring loaded devices that mount in passages in manifold 170, for example, threaded into manifold 170 whereby only the top of the valve is exposed, as shown in FIGS. 6 and 7. Though many types of check valves may be used, in one aspect, check valves 114 may be CXDA check valves provided by Sun Hydraulics Corporation, of Sarasota, Fla., or their equivalent. Passages in manifold 170 may be plugged with threaded plug 121. Fittings in FIGS. 6, 7, and 8 may include sealing devices, for example, o-rings or Teflon®-containing tape, to minimize or prevent the leakage of fluid.

According to one aspect of the invention, device 160 provides a convenient apparatus for accessing the hydraulic supply conduits, for example, conduits 30 or 32 shown in FIG. 1, to obtain pressure and flow readings from one or both of these conduits. According to one aspect of the invention, existing injection molding machines may be fitted with readily accessible hydraulic conduits having fittings whereby device 160 may be easily installed. In one aspect of the invention, device 160 may be used with any injection molding system that is hydraulically driven. According to another aspect of the invention, device 160 may be used with injection molding machines provided by MPI Incorporated of Poughkeepsie, N.Y., for example, with systems marketed by MPI under the names MPI 34, MPI 44, MPI 45, MPI 54, MPI 55, MPI 104, and MPI 105, among others.

It will be apparent to those of skill in the art that many different fittings and fitting combinations may be used to implement device 160 without deviating from the desired function of the invention.

According to one aspect of the invention, a stand-alone graphing system for an injection molding system is provided that can be added to any hydraulic molding injection system, for example, for the injection molding systems provided by MPI Incorporated listed above as well as others. This aspect of the invention may be dedicated to one injection molding system or machine, may be transportable between systems or machines, or may be transported by service technicians on service calls and to operator training classes. According to aspects of the invention, the following features and advantages may be provided:

Providing the capability of adding a parameter graphing feature to existing injection molding systems.
Providing the capability of transporting injection molding setups between injection molding systems of different designs.
Providing a service tool that can be used, among other things, as a trouble shooting aid and a die setup aid.
Providing a training tool for operator training programs, for example, aspects of the invention may be connected to any injection molding machines to illustrate the interaction of pressure and flow of molding medium.
Providing a graphing system that can replace existing test units, as well as a tool to document a medium flow of a machine or system.

In one aspect of the invention, a molding machine monitoring and/or regulating system may be provided with an operator interface panel, for example, panel referred to as an "Operator Interface Terminal" (OIT). In one aspect, the OIT may be adapted to display at least some data entry information, for example, molding machine identification and molding machine parameters, such as piston bore sizes. This information may be provided to the interface panel by means of push buttons, toggle switches, or a keyboard for numerical values, and the like. In one aspect, the OIT may be supplied with operator security levels to prevent unwanted access and modification of the system. In another aspect, the invention may provide graphing of at least one molding medium parameter, for example, wax pressure and wax flow. In another aspect, the invention may provide for an operator selectable data collection trigger, for example, a control signal (e.g., a 120 VAC, 240 VAC, or 24 VDC signal) or an increase in the flow above a predetermined trigger value.

In another aspect, the invention may provide for displaying baseline performance graphs along with the actual performance graphs. For example, baseline graphs may be stored, and identified using alphanumeric names, for future recall and comparison. The saved graph data may be saved as a Comma Separated Values (CSV) file, for example, which can be read by other software, for instance, Microsoft Excel, among other software programs. In one aspect, the invention may include an interface for printing data, for example, on a wide variety of commercially available printers. The printer may be directly connected to a computer manipulating the data or connected to a network. In one aspect, the invention provides for the display of injected medium volume, for example, the injected medium volume may be calculated from the area under the medium flow versus time curve, for instance, by means of conventional integration methods.

In another aspect of the invention, the capability of displaying results over the Internet, for example, when connected to a network, may be provided. For instance, performance graphs may be viewed by others, for example, by supervisors, using a conventional web browser, for example, Microsoft's Internet Explorer. In one aspect, a remote user may print a graph to any printer accessible to the data acquisition system. In one aspect, the data acquisition system may support multiple languages, for example, English, French, Spanish, Italian, and German, among others. In one aspect, the invention may operate on either 120 VAC or 240 VAC. In one aspect, the invention may allow the user to select from a menu of injection molding machines or systems, for example, those supplied by MPI Incorporated as well as others. User defined data entry may also be provided, for example, hydraulic cylinder bore diameter and medium cylinder bore diameter, among other parameters. In another aspect of the invention, interfacing hardware may be provided to install aspects of the invention into an existing injection molding system, for example, the device 60 shown in FIGS. 2 and 3, by means of, for example, male and female quick connect couplings.

In another aspect, the invention may be provided with a diagnostic screen for maintenance purposes, for example, to identify communication errors and display PLC register values. Aspects of the invention may also be provided with the capability to perform remote diagnostics, for example, over the Internet. In one aspect, the capability may be provided to validate and/or recalibrate the invention, for example, on a regularly scheduled basis or as required using instruments, for example, with an accuracy that is traceable to the U.S. National Institute of Standards and Technology.

In one aspect of the invention, since the medium flow and pressure are calculated based on the hydraulic oil flow and pressure, no modifications are required to an existing injection molding device or system. For example, in one aspect, the invention may be installed by plumbing the device 60 in series with the injection cylinder and the data acquisition system 90 plugged into a wall socket. Thus, aspects of the invention may be portable from molding machine to molding machine or from one location to another remote location, for example, carried by a service technician, and connected to any hydraulic medium injection system including those provided by MPI as well as others. In one aspect of the invention, substantially the only information required may be the hydraulic cylinder bore diameter and the medium cylinder bore diameter. The rod diameter for double rodded systems may also be provided. In another aspect, the injection molding machine or system parameters of known molding machines may be stored in data acquisition system 90 and selected from a displayed menu.

According to aspects of the invention, the manufacturing and labor costs for providing aspects of the invention may be minimal. For example, the pressure transducer and the flow meter may be plumbed together with a handful of fittings, as shown in FIG. 2 and 3, and power may be provided by wiring to a small conventional electrical box. According to aspects of the invention, no modifications need to be made to an existing injection molding system to implement aspects of the invention, for example, no modifications need be made to the injection cylinder or control cylinder.

The systems and devices depicted herein are provided as examples of aspects of the invention. There may be many variations to these systems and devices or the steps (or operations) described therein without departing from the spirit of the invention. For instance, the steps may be performed in a different order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

I claim:

1. A system for monitoring the operation of an injection molding machine, the injection molding machine having an injection die, a molding medium injection cylinder having a piston adapted to inject a molding medium into the injection die, a control cylinder having a piston coupled to the molding medium injection piston, and a conduit for supplying the control cylinder with a fluid or removing fluid from the control cylinder, the system comprising:
    means for monitoring at least one parameter of the fluid in the conduit and outputting an electrical signal corresponding to the at least one parameter;
    an arithmetic processor adapted for receiving the electrical signal corresponding to the at least one parameter, the arithmetic processor having means to manipulate the electrical signal to determine at least one parameter of the molding medium injected into the injection die; and
    means for bypassing fluid flow around the means for monitoring the at least one parameter during an injection cylinder filling phase of operation.

2. The system as recited in claim 1, wherein the at least one parameter comprises at least one of fluid pressure and fluid flow.

3. The system as recited in claim 2, wherein the means for monitoring at least one of the fluid pressure and the flow rate comprises means for monitoring both the fluid pressure and flow rate.

4. The system as recited in claim 1, wherein the means for monitoring the at least one parameter comprises at least one of a flow meter and a pressure transducer.

5. The system as recited in claim 1, wherein the at least one parameter comprises at least one of fluid pressure and flow rate and wherein the means to manipulate the electrical signal comprises means for evaluating at least one of the equations:

$$Q_D = Q_1 \times A_2/A_1 \text{ and}$$

$$P_D = P_1 \times A_1/A_2;$$

wherein $Q_1$ is the monitored flow rate of the fluid; $P_1$ is the monitored pressure of the fluid; $A_1$ is the area of the control cylinder piston; $A_2$ is the area of the molding medium injection cylinder piston; $Q_D$ is the flow rate to the injection die; and $P_D$ is the pressure in the injection die.

6. The system recited in claim 1, further comprising a temperature sensing device positioned to detect the temperature of the fluid flowing to the injection die.

7. The system recited in claim 1, further comprising means for graphically displaying the at least one parameter of the molding medium over time.

8. The system as recited in claim 1, wherein the means for bypassing fluid flow around the means for monitoring the at least one parameter comprises at least one of a conduit and a passage through a manifold.

9. A device for monitoring the operation of an injection molding machine, the injection molding machine having an injection die, a molding medium injection cylinder having a piston adapted to inject a molding medium into the injection die, a control cylinder having a piston coupled to the molding medium injection piston and having at least one conduit in fluid communication with the control cylinder, the device comprising:
    at least one of a flow detecting device adapted to output an electrical signal corresponding to the fluid flow in the at least one conduit and a pressure detecting device adapted to output an electrical signal corresponding to the pressure in the at least one conduit;
    means for inserting at least one of the flow detecting device and the pressure detecting device into the at least one conduit in fluid communication with the control cylinder; and
    means for bypassing fluid flow around at least one of the flow detecting device and the pressure detecting device during injection cylinder filling phase of operation of the injection molding machine.

10. The device recited in claim 9, wherein the flow detecting device comprises a flow meter.

11. The device recited in claim 9, wherein the pressure detecting device comprises a pressure transducer.

12. The device recited in claim 9, wherein the means for inserting the device comprises at least one quick-disconnect coupling.

13. The device recited in claim 9, wherein the means for bypassing fluid flow further comprises at least one check valve.

14. The device as recited in claim 9, wherein the at least one conduit in fluid communication with the control cylinder comprises a fluid supply conduit.

15. The device as recited in claim 9, wherein that the at least one of a flow detecting device and the pressure detecting device comprises both the flow detecting device and the pressure detecting device.

16. A method for monitoring the operation of a injection molding machine, the injection molding machine having an injection die, a molding medium injection cylinder having a piston adapted to inject a molding medium into the injection die, and a control cylinder having a piston coupled to the molding medium injection cylinder piston, the control cylinder supplied with fluid by at least one conduit, the method comprising:
  providing a servicing device comprising;
    an input port, an output port, at least one fluid parameter sensor positioned between the input port and the output, and means for bypassing fluid flow around the at least one fluid parameter sensor during an injection cylinder filling phase of operation of the injection molding machine;
  attaching the input port of the servicing device to a source of fluid and attaching the output port in fluid communication with the control cylinder;
  providing a flow of fluid from the source of fluid to the input port;
  detecting at least one parameter of the fluid supplied to the control cylinder from the at least one fluid parameter sensor; and
  calculating at least one parameter of the fluid flow to the injection die using the at least one parameter of the fluid supplied to the control cylinder displaying the calculated at least one parameter on a display device.

17. The method recited in claim 16, wherein the at least one parameter comprises at least one of pressure and flow, and wherein calculating comprises evaluating at least one of the following equations:

$$Q_D = Q_1 \times A_2/A_1 \text{ and}$$

$$P_D = P_1 \times A_1/A_2;$$

wherein $Q_1$ is the detected flow rate; $P_1$ is the detected pressure; $A_1$ is the area of the control cylinder piston; $A_2$ is the area of the molding medium injection cylinder piston; $Q_D$ is the flow rate to the injection die; and $P_D$ is the pressure in the injection die.

18. The method recited in claim 17, further comprising detecting the temperature of the fluid supplied to the injection die.

19. The method recited in claim 18 further comprising graphically displaying at least one of the fluid pressure, the fluid flow, and the temperature over time.

20. The method recited in claim 17, wherein evaluating at least one of the equations comprises evaluating both of the equations.

21. The method as recited in claim 16, wherein detecting at least one parameter of the fluid comprises detecting both the fluid flow rate and the fluid pressure.

22. An injection molding machine servicing device adapted to detect at least one operating parameter of an injection molding machine, the injection molding machine supplied with a fluid from a fluid supply through at least one fluid supply port, the servicing device comprising:
  an input port adapted to be in fluid communication with the fluid supply;
  an output port adapted to engage the fluid supply port of the injection molding machine;
  at least one fluid parameter sensing device positioned between and in fluid communication with the input port and the output port; and
  a fluid bypass adapted to bypass fluid flow around the at least one sensing device during an injection cylinder filling phase of operation of the injection molding machine.

23. The servicing device recited in claim 22, wherein the sensing device comprises at least one of a fluid pressure senor and a fluid flow sensor.

24. The servicing device recite in claim 22, wherein the at least one sensing device is adapted to detect at least one parameter of the fluid passing through the servicing device.

25. The servicing device recite in claim 22, wherein the injection molding machine further comprises an injection cylinder adapted to inject molding medium into an injection die, and wherein the at least one sensing device is adapted to detect at least one parameter of the fluid passing through the servicing device, and wherein the at least one parameter is used to determine at least one parameter of the molding medium.

26. The servicing device recite in claim 25, wherein the at least one parameter of the fluid passing through the servicing device comprises at least one of pressure and flow, and wherein at least one of the pressure and flow are used to determine the at least one parameter of the molding medium by evaluating at least one of the following equations:

$$Q_D = Q_1 \times A_2/A_1 \text{ and}$$

$$P_D = P_1 \times A_1/A_2;$$

wherein $Q_1$ is the detected flow rate; $P_1$ is the detected pressure; $A_1$ is the area of a cylinder supplied by the service device; $A_2$ is the area of the molding medium injection cylinder; $Q_D$ is the flow rate to molding medium; and $P_D$ is the pressure of the molding medium.

27. The servicing device recite in claim 22, wherein the a fluid bypass comprises at least one check valve adapted to prevent flow through the bypass during the injection cylinder filling phase of operation of the injection molding machine.

* * * * *